No. 897,841. PATENTED SEPT. 1, 1908.
G. MOHME & A. V. HADLOCK.
TIRE TOOL.
APPLICATION FILED FEB. 8, 1907.

3 SHEETS—SHEET 1.

Witnesses
Harry R. White
Ray White.

Inventors
Gustave Mohme
Aaron V. Hadlock
By Morgan & Rubinstein
Attys

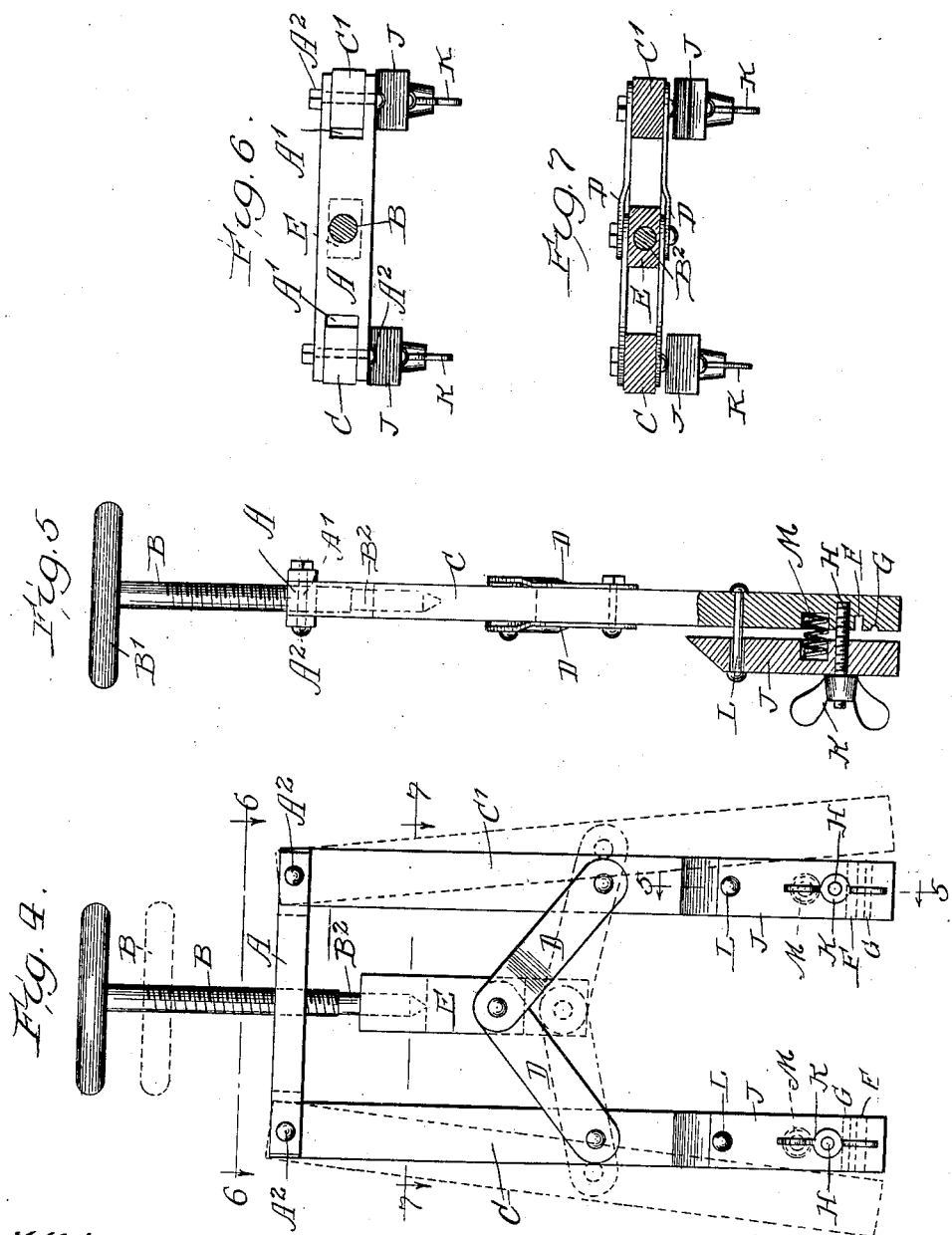

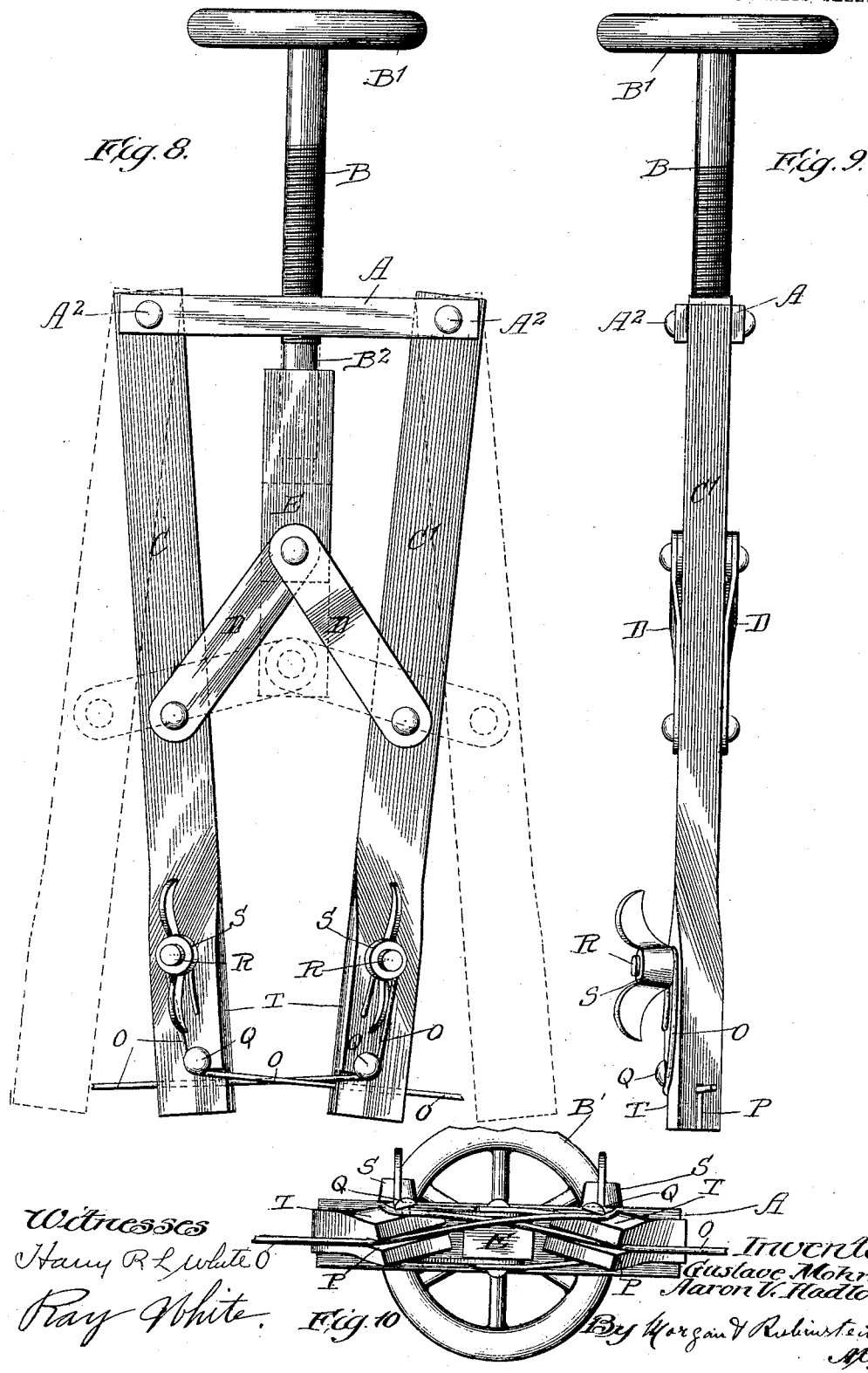

UNITED STATES PATENT OFFICE.

GUSTAVE MOHME AND AARON V. HADLOCK, OF CHICAGO, ILLINOIS.

TIRE-TOOL.

No. 897,841.

Specification of Letters Patent.

Patented Sept. 1, 1908.

Application filed February 8, 1907. Serial No. 356,457.

*To all whom it may concern:*

Be it known that we, GUSTAVE MOHME and AARON V. HADLOCK, citizens of the United States, residing, respectively, at 5906 Wentworth avenue and 616 Garfield Boulevard, in the city of Chicago, county of Cook, and State of Illinois, have invented a new and useful Tire-Tool, of which the following is a specification.

The object of our invention is to provide a hand tool for fitting rubber tires having a wire core on the rim of the particular wheel on which said tire is to be secured.

The manner in which we accomplish our object is described in the following specifications and illustrated in the accompanying drawings in which:—

Figure 1:
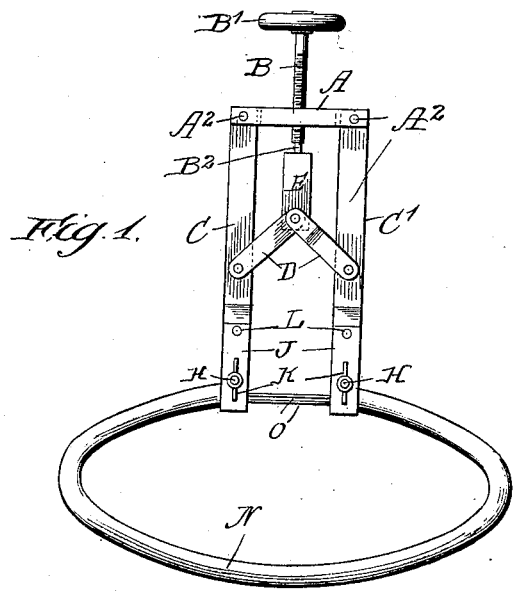
Figure 2:
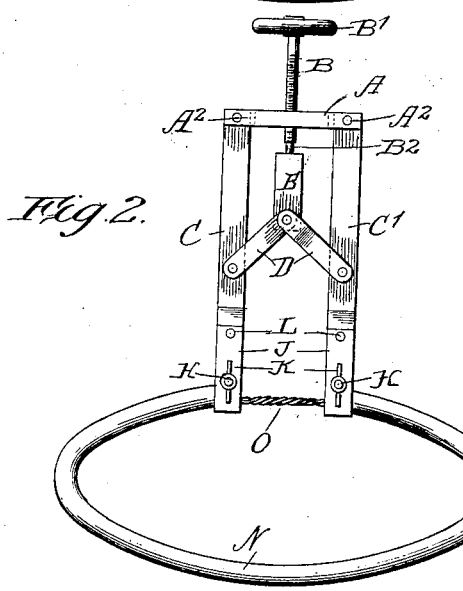
Figure 3:
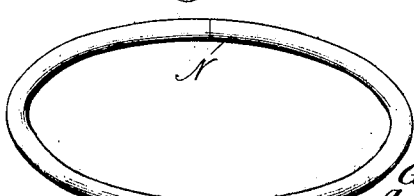

Figure 1 is a plan view of our device showing the tire and the wire therein in the position when the fit has been made on the rim of the wheel. Fig. 2 is the same general view as Fig. 1, except the parts of the center wire held in our device parallel to each other in Fig. 1 are shown to be twisted together and the size of the tire thereby made permanent. Fig. 3 shows the tire removed from the tool after the wire is twisted and loose ends removed, the ends of the rubber tire being brought together over the twisted part of the wire, the tire being thereby made ready for placing permanently on the wheel. Fig. 4 is an enlarged plan view showing the construction and movement of the several parts of the device, Fig. 5 is a right side view a part of the arm and jaw being shown in section on the line 5—5 Fig. 4. Fig. 6 is an end view, the operating screw being shown in section on the line 6—6 Fig. 4, Fig. 7 is a cross sectional view on the line 7—7 Fig. 4. Fig. 8 is the same relative view as Fig. 4 without the jaws and showing a simpler method of securing the ends of the wire. Fig. 9 is a side view of Fig. 8 and Fig. 10 is an end view of Fig. 8.

In the drawings A indicates an end crossbar having a central threaded hole adapted to support an operating screw B provided with a handle $B^1$. The ends of the bar A are constructed with open horizontal slots $A^1$ and transverse pivot holes adapted to support pivot bolts $A^2$. Pivotally secured in the slots $A^1$ by the pivot bolts $A^2$ are two arms C and $C^1$. These arms are pivotally connected about the center of their length by two pairs of strap links D. These links are pivotally connected at their other ends to a link block E. The end of this link block is adapted to receive the end $B^2$ of the screw B. The link block E and links D form a toggle joint operated by the screw B, the movements of which open and close the free ends of the arms C and $C^1$. In the top face of the free end of each of the arms shown in Figs. 4 and 5 are two transverse shallow parallel grooves F and G. Each of the grooves F are adapted in width and depth to allow the wire in the tires to slide through freely, the grooves thereby serving as guides which hold the wire in position in the tool. Each of the grooves G are adapted in size to grip and securely hold the wire when pressed therein as hereinafter described. The relative positions of the grooves in the two arms are opposite, the groove F being outside the groove G in the arm C, and inside in the arm $C^1$, as shown by the dotted lines in Fig. 4 the purpose of this arrangement being hereafter described. Adjacent to the inside groove in each arm is a threaded rod H affixed in the arm. On each of these rods is a jaw J adapted to be forced down by the thumb nut K on to the wire held in the grooves. These jaws are held in a position parallel with the arms by the pins L which extend through the jaw and arm as shown in Fig. 5. In a suitable recess in the arms and jaws are coiled springs M adapted to force the jaws and arms apart when the thumb nuts are released.

In Figs. 8, 9 and 10 we show a simpler way of securing the wire to the tool by which we dispense with the grooves F and G, rods H, jaws J, springs M and pins L. In the front end of each of the arms C and $C^1$ is a horizontal slot P adapted to receive and guide the tire wire as shown in Figs. 9 and 10. In the face and slightly inside the bottom line of the slot P, in the end of each arm is a stud Q and back of each of these studs is a vertical screw R and thumb nut S. The slotted ends of the arms C and $C^1$ are twisted above the horizontal plane as shown in Figs. 9 and 10 to conform to the curve of the rim of the wheel on which they are adapted to rest while the tire is being fitted and to thereby bring the tire wire held between the arms close to the rim of the wheel, to aid in this purpose the top of the end of each arm is beveled as shown at T in Figs. 8 and 9.

When our device is constructed as described and illustrated its use and operation is as follows: The rubber tire N cut to the size desired is taken in the hands and the wire O, protruding from each end is fastened to the device as follows reference being had to Fig. 8. The screw B is turned so as to allow the ends of the arms C and C¹ to be brought close together as shown in Fig. 8. One end of the tire wire is placed in the slot P in the arm C, passed around the stud Q and screw R under the thumb nut S on the arm C¹ and the thumb nut screwed on the wire. The other end of the wire is placed in the slot P in the arm C¹, and around the stud Q and screw R under the thumb screw S on the arm C and the nut screwed down firmly on the wire. When the ends of the wire are thus secured, the parts between the studs Q are crossed and rest on the beveled parts T as shown in Fig. 10. The tire is then placed in the rim of the wheel to which it is to be fitted, the underside of the ends of the arms resting on the wheel rim. The screw B is then turned so as to force the link block E forward into the position shown by the dotted lines in Figs. 4 and 8 the links D forcing the ends of the arms apart thereby drawing the tire wire through the slots P till the tension desired is secured around the rim of the wheel. The parts of the wire stretched between the arms is then twisted as shown in Fig. 2. The tire is then slipped off the rim and the tension on the wire is then released by a reverse turn of the screw B, the ends around the studs P are cut off, and the wire removed from the slots Q. The ends of the rubber tire are then brought over the twisted part of the wire as shown in Fig. 3 and the tire is then ready to be placed permanently on the rim of the wheel.

In the device provided with the jaws shown in Figs. 4 and 5 one end of the wire is placed in the groove F in the arm C and in the groove G in the arm C¹. The other end of the wire is placed in the groove F in the arm C¹ and in the groove A in the arm C, the jaws are then screwed down on the wire in the grooves F and the arms opened as before described to draw the wire tight on the rim of the wheel, and the wire is twisted while it is held on the rim and ends cut off.

What we claim and desire to secure by Letters Patent is:

1. In a device of the kind described, a bar, a pair of arms pivotally connected to said bar at opposite ends thereof, each arm being provided with a transverse recess at its end, and the face of each arm adjacent its end being in a plane at an angle to the face of the rest of the arm, a wire guide and a wire clamp near the end of each arm, and means for causing movement of the ends of said arms towards and from each other.

2. In a device of the character described, the combination with a bar, of a pair of arms pivoted to said bar, a link pivoted to each of said arms, a member to which the inner ends of each of said links are pivoted, a manually operable screw threaded into said bar and engaging said member, and wire engaging clamps carried by each of said arms, said arms having slots formed in their lower ends, said slots lying at such an angle that when wires are passed therethrough and secured to the clamps of the opposite arms, said wires will cross each other.

GUSTAVE MOHME.
AARON V. HADLOCK.

Witnesses:
JOSEPH STAAB,
THOMAS J. MORGAN.